(12) United States Patent
Sullivan et al.

(10) Patent No.: US 7,834,864 B2
(45) Date of Patent: Nov. 16, 2010

(54) SYSTEM AND METHOD COMPRISING A USER INTERFACE FOR CONTROL OF SCIENTIFIC IMAGE ACQUISITION

(75) Inventors: Ryan E. Sullivan, Yardley, PA (US); Mike Kovach, London (CA); Jens Wulf, Grafelfing (DE)

(73) Assignee: Photon Technology International, Inc., Birmingham, NJ (US)

( * ) Notice: Subject to any disclaimer, the term of this patent is extended or adjusted under 35 U.S.C. 154(b) by 737 days.

(21) Appl. No.: 11/676,260

(22) Filed: Feb. 16, 2007

(65) Prior Publication Data
US 2007/0256013 A1    Nov. 1, 2007

Related U.S. Application Data

(60) Provisional application No. 60/773,861, filed on Feb. 16, 2006.

(51) Int. Cl.
*G09G 5/00* (2006.01)
(52) U.S. Cl. .................................. 345/184; 345/156

(58) Field of Classification Search .......... 345/156–184
See application file for complete search history.

(56) References Cited

U.S. PATENT DOCUMENTS

| 6,400,377 | B1 | 6/2002 | Hiraka et al. | |
|---|---|---|---|---|
| 6,593,941 | B1 | 7/2003 | Sameshima | |
| 7,333,219 | B2 * | 2/2008 | Yu et al. | 356/615 |
| 7,549,961 | B1 * | 6/2009 | Hwang | 600/440 |
| 2002/0140665 | A1 * | 10/2002 | Gordon | 345/156 |
| 2004/0156616 | A1 * | 8/2004 | Strub et al. | 386/46 |
| 2005/0022158 | A1 * | 1/2005 | Launay et al. | 717/104 |

* cited by examiner

*Primary Examiner*—Kevin M Nguyen
(74) *Attorney, Agent, or Firm*—Fox Rothschild LLP; Perry M. Fonseca

(57) ABSTRACT

The present invention provides a control interface for one or more instruments that comprise an image acquisition system, the control interface consisting of kinesthetic controls that do not require visual attention. The control interface of the present invention maps kinesthetic controls such as sliders and knobs to a system computer and software running thereon which is directing the operation of individual imaging instruments.

2 Claims, 4 Drawing Sheets

US 7,834,864 B2

SYSTEM AND METHOD COMPRISING A USER INTERFACE FOR CONTROL OF SCIENTIFIC IMAGE ACQUISITION

CROSS-REFERENCE TO RELATED APPLICATIONS

This application is based on and claims priority to U.S. Provisional Application No. 60/773,861, filed Feb. 16, 2006, the contents of which are fully incorporated herein by reference.

BACKGROUND OF THE INVENTION

1. Field of the Invention

This invention pertains to the real-time control of image acquisition hardware, and, more particularly to the user interface for the adjustment of the hardware.

2. Description of Related Art

Many electronic scientific instruments and systems do not have external control adjustments. Instead, control adjustments are performed by providing an interface connecting the instrument or system with a computer or other processing device, enabling control to be performed through interactions with a menu on a video display through a pointing device such as a mouse and/or a keyboard. U.S. Pat. No. 6,400,377 is typical of such a system.

Some scientific instruments and systems do utilize external controls; however, like those described above, they still require an interface that maps the external controls to a menu driven video display and computer keyboard. U.S. Pat. No. 6,593,941 is typical of this type of system.

The above-described interfaces function adequately, but are insufficient as an interface for the real-time control of image acquisition hardware such as reflected fluorescence microscopes, scanning monochromators, and the like. In image acquisition, the visual attention of the user is focused on the display of the images that are being acquired (e.g., in the lens of the microscope) and having to turn to a separate display of controls and control menus on a computer display is a significant distraction and slows down the process. In many experimental situations, time is of the essence as the experimental conditions degrade very quickly, and the need to turn attention away from the experiment to manipulate controls requires that the experiment be restarted.

Further, image acquisition hardware used in scientific measurements is frequently used in a dark environment; in such an environment, locating specific controlling keys on a computer keyboard is very difficult. Finally, when a video display is located adjacent to the image being acquired, the light from the video display illuminates the image and thus degrades the acquired image, much the way too much light in a photographic exposure can "wash out" a photograph.

Accordingly, there is needed a kinesthetic control interface for use with image acquisition devices that enables precise control, via kinesthetic controls that do not require visual attention, and therefore do not utilize a video display device emitting extraneous light towards the image being acquired.

SUMMARY OF THE INVENTION

Briefly described, the present invention provides a control interface for one or more instruments that comprise an image acquisition system, the control interface consisting of kinesthetic controls that do not require visual attention.

The control interface of the present invention maps kinesthetic controls such as sliders and knobs to a system computer and software running thereon which is directing the operation of individual instruments.

The control interface may map overlapping functions in the ensemble of imaging instruments into a single control. For example, the individual brightness controls for multiple instruments can each be mapped to a single control that spans the range of all of the individual adjustments.

According to the invention, the control interface may comprise a kinesthetic control device with a microprocessor interface that communicates the settings of the kinesthetic controls to the system controller and software running on the system controller. The above embodiment may be implemented as an interface card and program within the system controller, the combination of which replicates the functions of the kinesthetic control device.

DETAILED DESCRIPTION OF THE PREFERRED EMBODIMENT

Figure 1:
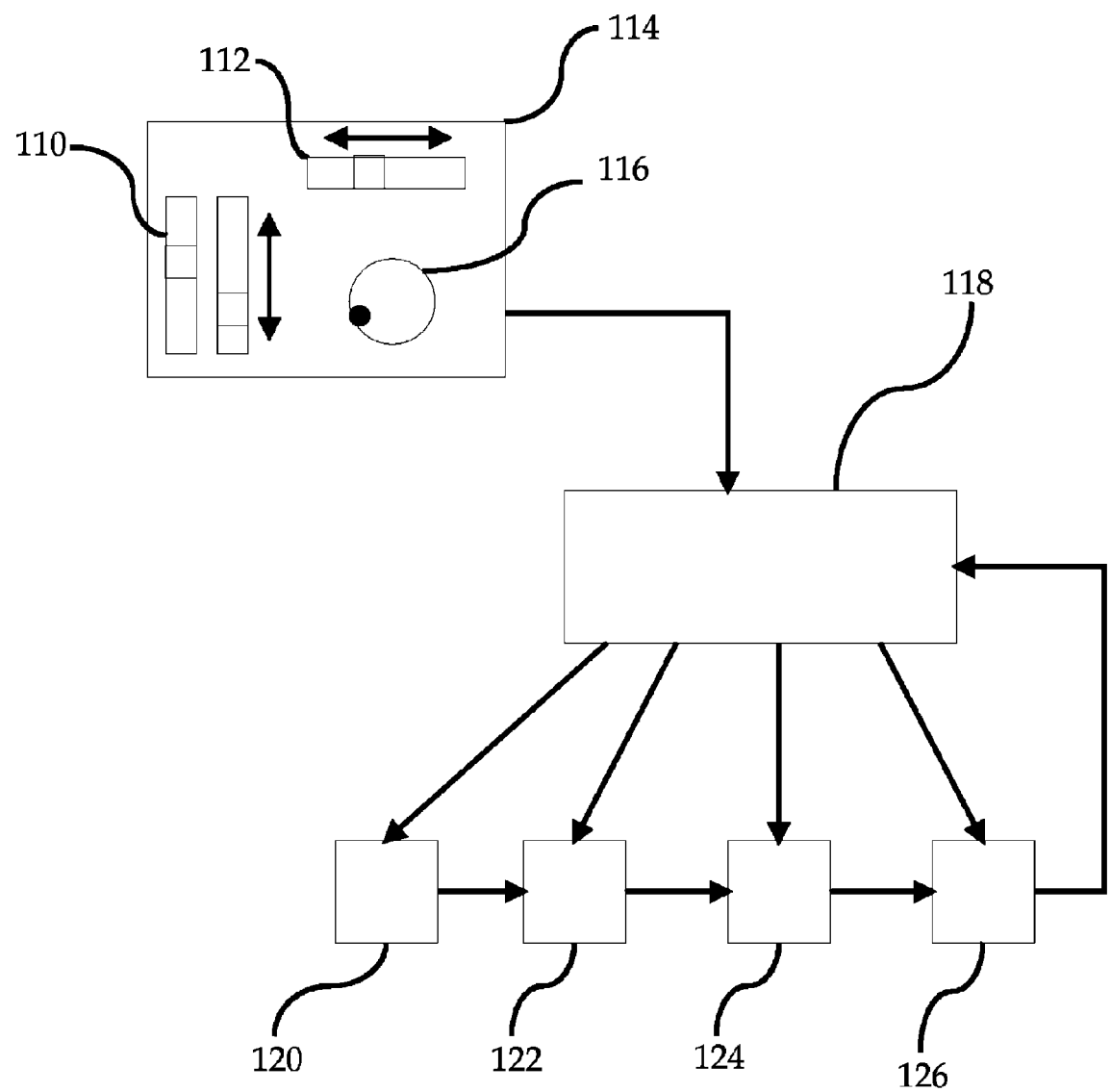
FIG. 1 is a block diagram showing a general configuration of an embodiment of the present invention comprising an image acquisition system coupled to a control interface.

FIG. 1 illustrates a system in accordance with the present invention. A system controller 118 is coupled to various elements making up an image acquisition system including, for example, the light source 120, a monochromator 122, a sample holder with iris 124, and a camera 126. These elements are typically found in the prior art and function in a well the manner that is summarized below. In accordance with the present invention, a kinesthetic control interface device 114 is coupled to system controller 118. As used herein, the term "kinesthetic control interface device" means a control device having manipulatable controls wherein the physical manipulation of the control (e.g., moving a slider or rotating a knob) and not having a requirement that visual attention be given to obtain this feedback. The control elements of kinesthetic control interface device 114 are mapped to corresponding controls associated with system controller 118, thereby giving a user of the kinesthetic control interface device 114 the ability to control the image acquisition system without having to physically manipulate or view the video display device of system controller 118.

Referring to FIG. 1, the kinesthetic control interface device 114 includes multiple control elements such as slider controls 110 and 112 (faders) and rotary control 116, and can include other similar elements. These controls are standard controls and are typically found in audio controllers, mixers, multimedia controllers and the like. The kinesthetic control interface device 114 can be any kind of control device that can be operatively coupled to a processing device (e.g., a computer system) such as system controller 118 described below. A typical such interface device is the MCS-3400 Media Command Station manufactured by JL Cooper Electronics of El Segundo, Calif., which has controls suitable for use in a dark environment and that do not require viewing of a computer monitor to operate. Using well-known programming techniques [true?] the kinesthetic control interface device 114 is programmed to map each of its control elements to perform a control that can also be performed by system controller 18. For example, a fader 110 is mapped to a virtual fader or slider control performed by the software of system controller 118 in the prior art. Thus, an upward movement of fader 110 will cause a similar upward movement of the virtual fader provided by system controller 118 and its software. In a similar manner, each of the controls of kinesthetic control interface device 114 are mapped to a function performed by system controller 118 and its software. Further, to the extend the control elements of kinesthetic control interface device 114 are motorized or otherwise capable of remote manipulation, control of a virtual control element or the system controller 118 will also correspondingly move the appropriate control element on kinesthetic control interface device 114.

The kinesthetic control interface device 114 is connected to a system controller 118, using a standard interface such as a USB connector. System controller 118 can comprise, for example, a standard personal computer including a keyboard, mouse, and video monitor. As discussed above, it is well known to utilize a system controller to control the operation of an image acquisition system; typically the system controller comprises a computer connected to the elements of the image acquisition system (described in more detail below), with the computer including software that configures it for performing this control. Thus, for example, the software can configure the computer to change frequencies of a monochromator that is part of the image acquisition system based on keyboard input and/or mouse movement that activates software control elements (e.g., a virtual sliding switch or fader) being displayed on the video monitor of the computer.

The system controller 118 sends commands to the image acquisition devices, for example, a light source 120, a monochromator 122, a sample holder with an iris 124, and a camera 126. Images from the camera 126 are accumulated and stored by the system controller 118 and are utilized for analysis purposes as is well known. Adjustments to the image acquisition devices are performed by manipulation of the controls on kinesthetic control interface device 114 as the user of the system views the sample (typically through a microscope). The system controller 118 can be located away from the image acquisition devices, even in a different room, and/or the video monitor of system controller 118 can be turned off, since the user need not view the monitor while making the adjustments. As the user makes adjustments using the kinesthetic control interface device 114, he or she can view the sample and see any changes occurring with respect to the sample.

Figure 2:
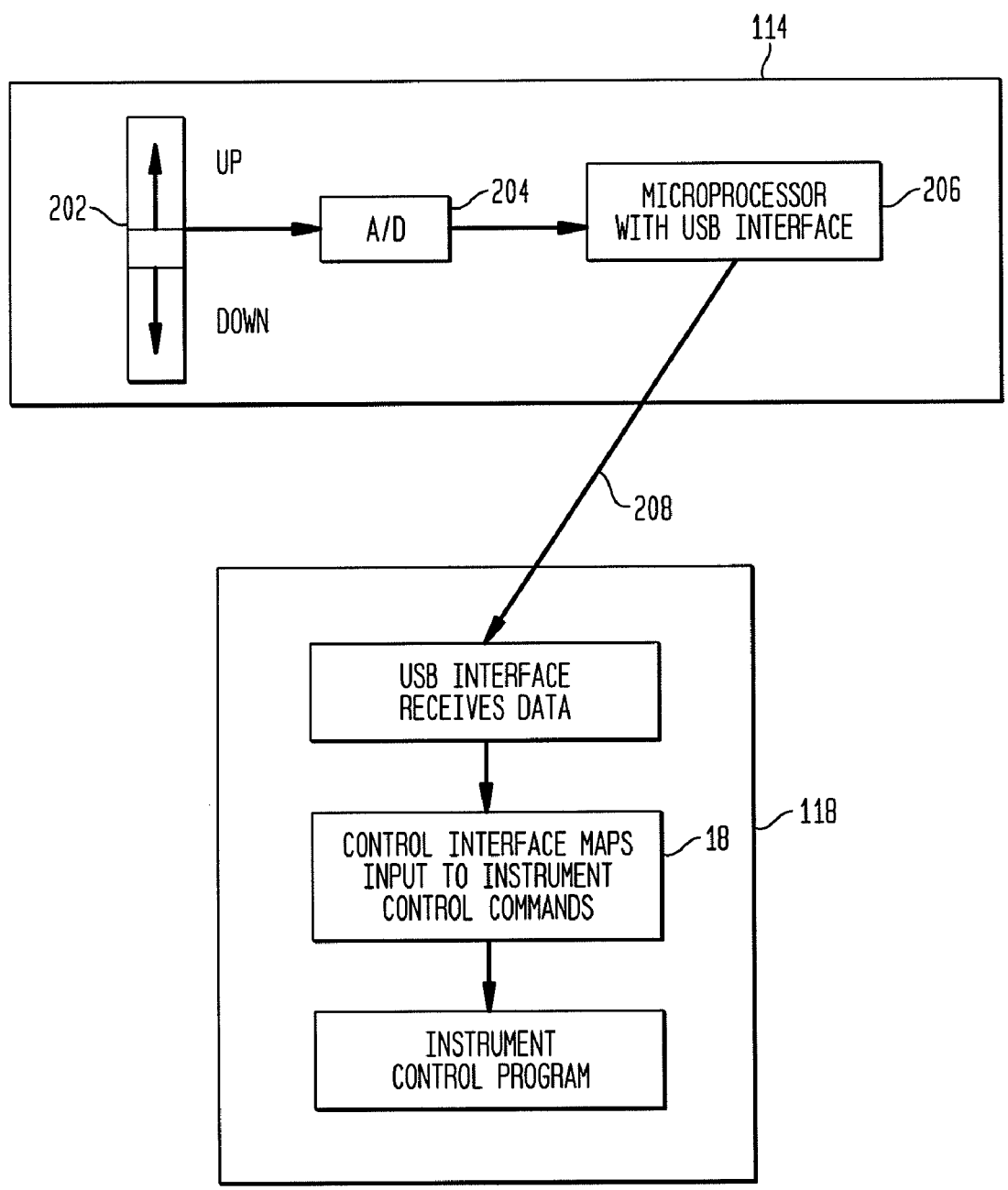
FIG. 2 is a block diagram showing an implementation of the control interface of the present invention implemented with kinesthetic feedback.

FIG. 2 illustrates a kinesthetic control interface device 114 of the present invention in more detail. It is illustrated as shown for purpose of example and it is understood that numerous other configurations of kinesthetic control interface device 114 can be created and all will still fall within the scope of the present invention. Referring to FIG. 2, a slider 202 outputs a voltage proportional to its position along its sliding path. An analog-to-digital converter 204 receives the output voltage from slider 202 and converts it to a digital representation of the voltage (and thus a digital representation of the position of slider 202). This digital representation is then input to a microprocessor 206. Microprocessor 206 sends this digital representation of the sliders position to system controller 118 via the USB connection 208.

Within the system controller 118, a computer program receives the digital representation of the sliders position, maps that data to a control command associated with the control function of the system controller 118, and passes that command to an instrument control software program within the system controller 118. In a known manner, this instrument control software program controls the particular imaging acquisition element associated with the slider 202. In this manner, the kinesthetic control interface device 114 can control the imaging acquisition elements.

Figure 3:
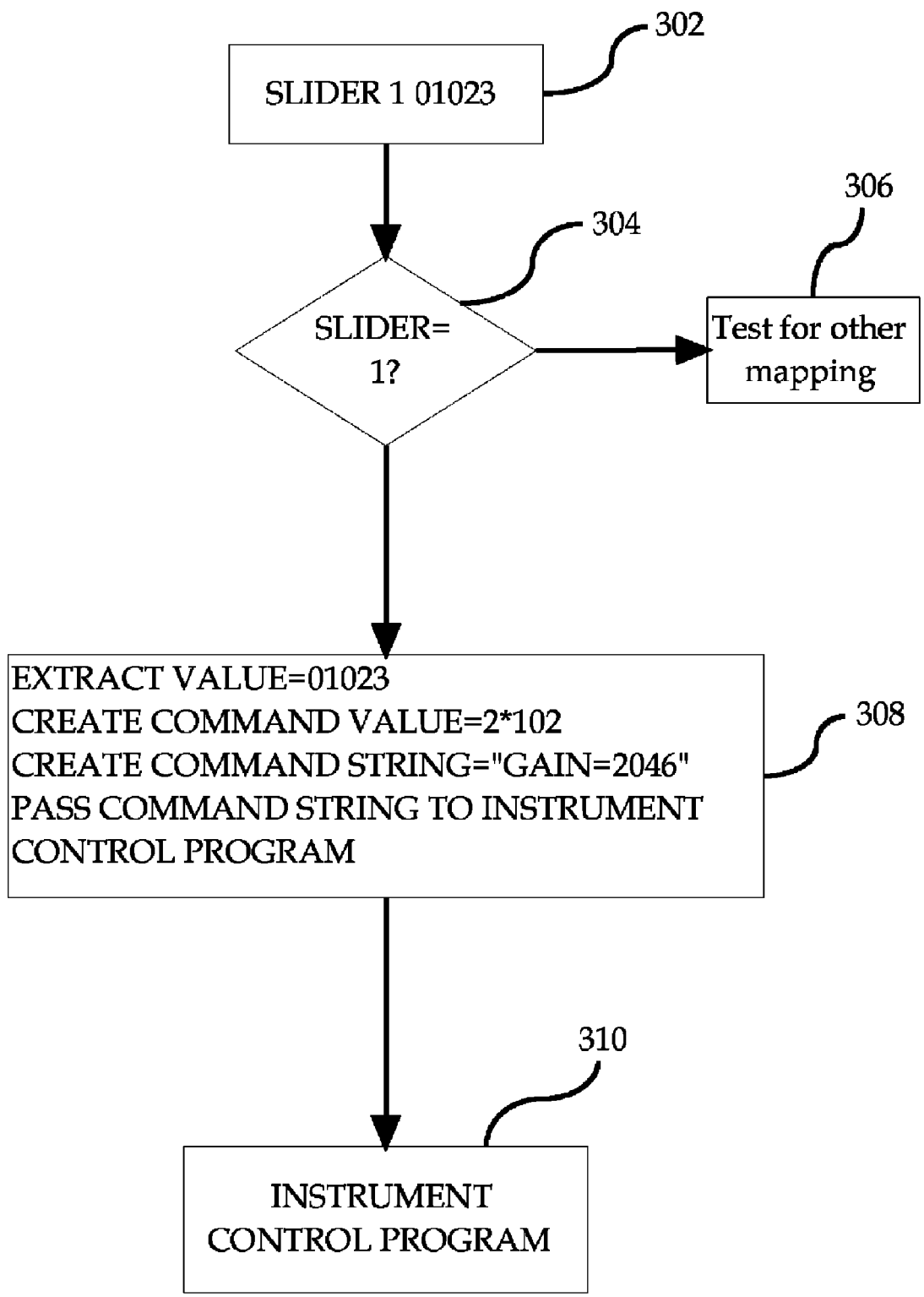
FIG. 3 is a block diagram showing a mapping between a control in the control interface and a single instrument.

FIG. 3 is a flowchart illustrating a typical mapping from the kinesthetic control interface device 114 to a single instrument in the system. At step 202, data from the kinesthetic control interface device is input to the system processor 118, and this data contains information both identifying the origin of the data (SLIDER 1) and the value of the data (01023). The data is tested for its origin at step 304. In this example SLIDER 1 controls a gain value, i.e., it is a gain control. At step 304, if it is determined that the data originated from SLIDER 1 (SLIDER=1), the data (01023) is sent to a gain control routine at step 308. If at step 304 it is determined that the data did not originate from SLIDER 1 (SLIDER≠1) then the origin is not the gain control, and other mapping tests are performed at step 306, in a similar manner until the origin of the data input can be determined.

At step 308, the gain control routine extracts the command value (01023), and maps that value to a control string of the control software residing on system controller 118. At step 310, that control string is then passed to the instrument control program which sets the instrument parameter to the new value.

Figure 4:
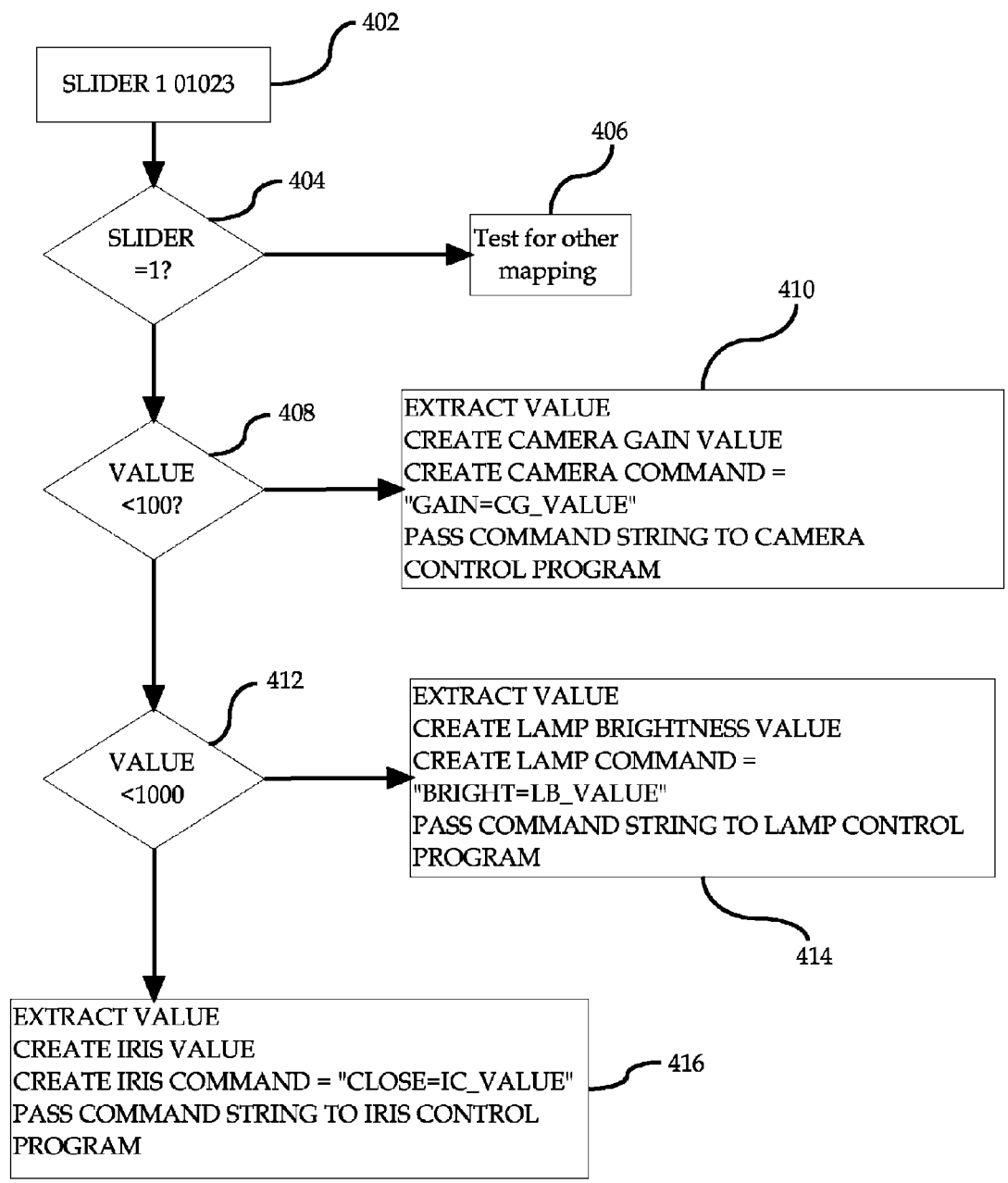
FIG. 4 is a block diagram showing a mapping between a control in the control interface and multiple instruments that impact the intensity function.

FIG. 4 is a flowchart illustrating the process of mapping from the kinesthetic control interface device 114 to multiple instruments in the system using pre-set parameters. At step 402, the data from the control interface containing data containing both the origin of the data (SLIDER 1) and the value of the data (01023) is received by the system processor 118. As in the example illustrated in FIG. 3, at step 404, the data is tested for its origin and then proceeds to either step 406 or step 408 for a mapping appropriate to the origin.

Assuming a determination is made at step 404 that the origin of the data is SLIDER 1, the process proceeds to step 408, where the value of the data is tested. Depending on the value of the data, and other values such as the system state, one of several operations is performed. In the example of FIG. 4, if the data value is less than 100 (step 408) the value is used to adjust the camera gain (step 410). If the value is greater than 100 but less than 1000 (step 412), the value is used to adjust the lamp brightness (step 414). If the value is greater than 1000, the value is used to set the iris opening (step 416). Thus, depending on the value of the data coming from a particular control element, its function may be easily changed so as to allow multiple mappings for the same control element. Thus, by establishing pre-set buttons on control interface 114, a single control can be used for multiple functions, increasing the versatility and usability of the present invention.

As noted above, many different control functions can be controlled using control interface 18. The elements that can be controlled include, but are not limited to Channel select, Channel Record enable, Channel autoexposure, Channel solo, Channel insert, Channel mute, Plug-in Bypass, Channel exposure time, Camera gain, Channel wavelength, Journal event markers, Session Save, Graph Vertical Zoom, Graph Horizontal Zoom, Channel Window selections, Channel Plug-in inserts, Return to zero, Rewind, Fast Forward, Stop, Play, Master Record Enable, Goto End, Jog/Shuttle enable, Shuttle Wheel forward/Back, Jog Wheel forward/back, Mode Locate, Set locate, Clear/Cancel, and last locate.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A system for controlling a scientific instrumentation image acquisition system, comprising:
    image acquisition system comprising one or more image acquisition elements;
    a system controller coupled to said scientific instrumentation image acquisition system, said system controller having software control elements for controlling the operation of said scientific instrumentation image acquisition system; and
    a kinesthetic control interface, coupled to said system controller, having one or more kinesthetic control elements mapped to the software control elements of said system controller, whereby said one or more image acquisition elements are controllable by said kinesthetic control interface without requiring visual attention.

2. A method for kinesthetically controlling a scientific instrumentation image acquisition system having a system controller coupled to said scientific instrumentation image acquisition system, said system controller having software control elements for controlling the operation of said image acquisition system, comprising:
    mapping one or more kinesthetic control elements of a kinesthetic control interface to the software control elements of said system controller, whereby said scientific instrumentation image acquisition system is controllable by said kinesthetic control interface without requiring visual attention.

* * * * *